(12) United States Patent
Eronen et al.

(10) Patent No.: US 9,940,970 B2
(45) Date of Patent: Apr. 10, 2018

(54) VIDEO REMIXING SYSTEM

(75) Inventors: Antti Johannes Eronen, Tampere (FI); Juha Henrik Arrasvuori, Tampere (FI); Arto Juhani Lehtiniemi, Lempäälä (FI); Igor Curcio, Tampere (FI); Jukka Antero Holm, Tampere (FI); Mikko Roininen, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 14/408,213

(22) PCT Filed: Jun. 29, 2012

(86) PCT No.: PCT/FI2012/050692
§ 371 (c)(1),
(2), (4) Date: Dec. 15, 2014

(87) PCT Pub. No.: WO2014/001607
PCT Pub. Date: Jan. 3, 2014

(65) Prior Publication Data
US 2015/0194185 A1   Jul. 9, 2015

(51) Int. Cl.
*H04N 5/93* (2006.01)
*G11B 27/00* (2006.01)
(Continued)

(52) U.S. Cl.
CPC .......... *G11B 27/031* (2013.01); *G11B 27/034* (2013.01); *G11B 27/28* (2013.01); *H04N 13/02* (2013.01); *H04N 21/233* (2013.01); *H04N 21/23418* (2013.01); *H04N 21/23424* (2013.01); *H04N 21/251* (2013.01); *H04N 21/2665* (2013.01); *H04N 21/4223* (2013.01);
(Continued)

(58) Field of Classification Search
USPC .................. 386/223–231, 248, 278, 282–287
See application file for complete search history.

(56) References Cited

U.S. PATENT DOCUMENTS 4,926,737 A   5/1990   Minamitaka
7,276,656 B2   10/2007   Wang
(Continued)

FOREIGN PATENT DOCUMENTS

EP   1876583 A1   1/2008
WO   2009055929   5/2009
(Continued)

OTHER PUBLICATIONS

International Search Report and Written Opinion received for corresponding Patent Cooperation Treaty Application No. PCT/FI2012/050692, dated Jun. 24, 2013, 14 pages.
(Continued)

*Primary Examiner* — Nigar Chowdhury
(74) *Attorney, Agent, or Firm* — Dinsmore & Shohl LLP

(57) ABSTRACT

A method comprising obtaining, by an automatic video media remixing service, at least one source of media content to be used as a reference media content; analysing the at least one reference media content according to at least one stylistic parameter; and determining, on the basis of the at least one stylistic parameter, at least one editing rule or parameter for controlling creation of an automatic media remix.

20 Claims, 6 Drawing Sheets

(51) Int. Cl.
*G11B 27/031* (2006.01)
*H04N 21/233* (2011.01)
*H04N 21/234* (2011.01)
*H04N 21/25* (2011.01)
*H04N 21/2665* (2011.01)
*H04N 21/4223* (2011.01)
*H04N 21/478* (2011.01)
*H04N 21/61* (2011.01)
*H04N 21/63* (2011.01)
*H04N 21/658* (2011.01)
*H04N 21/84* (2011.01)
*H04N 21/845* (2011.01)
*H04N 13/02* (2006.01)
*G11B 27/034* (2006.01)
*G11B 27/28* (2006.01)
*H04N 21/2743* (2011.01)
*H04N 21/414* (2011.01)
*H04N 21/422* (2011.01)
*H04N 21/439* (2011.01)
*H04N 21/4408* (2011.01)
*H04N 21/44* (2011.01)
*H04N 21/462* (2011.01)
*H04N 21/466* (2011.01)
*H04N 13/04* (2006.01)

(52) U.S. Cl.
CPC ..... *H04N 21/42203* (2013.01); *H04N 21/478* (2013.01); *H04N 21/6125* (2013.01); *H04N 21/6175* (2013.01); *H04N 21/632* (2013.01); *H04N 21/6581* (2013.01); *H04N 21/84* (2013.01); *H04N 21/8456* (2013.01); *H04N 13/04* (2013.01); *H04N 21/2743* (2013.01); *H04N 21/41407* (2013.01); *H04N 21/42202* (2013.01); *H04N 21/4394* (2013.01); *H04N 21/4408* (2013.01); *H04N 21/44016* (2013.01); *H04N 21/466* (2013.01); *H04N 21/4622* (2013.01)

(56) References Cited

U.S. PATENT DOCUMENTS

| | | | |
|---|---|---|---|
| 2006/0126452 A1 | 6/2006 | Yamashita et al. | |
| 2007/0067724 A1 | 3/2007 | Takahashi et al. | |
| 2008/0037826 A1* | 2/2008 | Sundstrom | G06F 17/30265 382/103 |
| 2008/0059895 A1* | 3/2008 | Hosoya | G06F 17/30058 715/762 |
| 2008/0120550 A1 | 5/2008 | Oakley et al. | |
| 2011/0217019 A1* | 9/2011 | Kamezawa | H04N 9/8042 386/224 |
| 2015/0213147 A1* | 7/2015 | Riggs | G06F 17/2247 715/234 |

FOREIGN PATENT DOCUMENTS

| | | |
|---|---|---|
| WO | 2010/119181 A1 | 10/2010 |
| WO | 2013/001135 A1 | 1/2013 |
| WO | 2013/164661 A1 | 11/2013 |

OTHER PUBLICATIONS

Nitta, N. et al. Example-based video remixing for home videos. In:2011 IEEE Interantional Conference on Multimedia and Expo (ICME), Jul. 11, 2011.

Cricri et al., "Multimodal Event Detection in User Generated Videos", IEEE International Symposium on Multimedia, Dec. 5-7, 2011, pp. 263-270.

Cricri et al., "Sensor-based Analysis of User Generated Video for Multi-camera Video Remixing", 18th International Conference on Multimedia Modeling, Jan. 4-6, 2011, pp. 255-265.

Yu et al., "AVPUC: Automatic Video Production with User Customization", Proceedings of the SPIE, vol. 5680, 2004, pp. 203-215.

Rubin, "Constraint-Based Cinematic Editing", Thesis, 1987, pp. 1-67.

Nitta et al., "Example-based video remixing", Multimedia Tools and Applications, vol. 51, No. 2, Jan. 2011, pp. 649-673.

Papadopoulos et al., "Joint Estimation of Chords and Downbeats From an Audio Signal", IEEE Transactions on Audio, Speech, and Language Processing, 2011, pp. 138-152.

Lee et al., "Automatic Music Mood Detection Through musical Structure Analysis", 2nd International Conference on Computer Science and its Applications, 2009, pp. 1-6.

Shrestha et al., "Automatic mashup generation from multiple-camera concert recordings", Proceedings of the 18th ACM international conference on Multimedia, 2010, pp. 541-550.

Paulus et al., "Music Structure Analysis Using a Probabilistic Fitness Measure and an Integrated Musicological Model", The International Society of Music Information Retrieval, 2008. pp. 369-374.

Partial Supplementary European Search Report received for corresponding European Patent Application No. 12880158.6, dated Feb. 10, 2016, 06 pages.

Supplementary European Search Report for Application No. EP 12 88 0168 dated May 30, 2016.

\* cited by examiner

| | |
|---|---|
| X | Number of shots |
| X | Effects in shot transitions |
| X | Shot durations |
| | Cinematic technique used |
| | Audio-specific editing |
| | more ... |

Select attributes to be modeled

Fig. 6

VIDEO REMIXING SYSTEM

BACKGROUND

Multimedia capturing capabilities have become common features in portable devices. Thus, many people tend to record or capture an event, such as a music concert or a sport event, they are attending. During many occasions, there are multiple attendants capturing content from an event, whereby variations in capturing location, view, equipment, etc. result in a plurality of captured versions of the event with a high amount of variety in both the quality and the content of the captured media.

Media remixing is an application where multiple media recordings are combined in order to obtain a media mix that contains some segments selected from the plurality of media recordings. Video remixing, as such, is one of the basic manual video editing applications, for which various software products and services are already available. Furthermore, there exist automatic video remixing or editing systems, which use multiple instances of user-generated or professional recordings to automatically generate a remix that combines content from the available source content. Some automatic video remixing systems depend only on the recorded content, while others are capable of utilizing environmental context data that is recorded together with the video content. The context data may be, for example, sensor data received from a compass, an accelerometer, or a gyroscope, or global positioning system (GPS) location data.

In the existing automatic video remixing services, a remix presentation from an event, such as a music concert or a theatre play, is primarily based on the audio tracks of the source videos. Additionally, camera sensor data and video content analysis may be used for including or excluding wanted or unwanted video sections from a remix.

There is a demand for personalizing the video remix according to the preferences of the users requesting the remix. However, the existing automatic video remixing services offer very limited possibilities for the users to submit preference information, which would be taken into account when automatically creating the video remix.

SUMMARY

Now there has been invented an improved method and technical equipment implementing the method for creating a video remix according to a cinematic style defined by a user. Various aspects of the invention include methods, apparatuses, a system and computer programs, which are characterized by what is stated in the independent claims. Various embodiments of the invention are disclosed in the dependent claims.

The aspects of the invention are based on the idea of analysing stylistic parameters from reference videos and determining editing rules corresponding to the stylistic parameters, which enable a user of the automatic video editing system to request a video remix from a particular event to be created according to a particular style According to a first aspect, there is provided a method comprising: obtaining, by an automatic media remixing service, at least one source of media content to be used as a reference media content; analysing the at least one reference media content according to at least one stylistic parameter; and determining, on the basis of the at least one stylistic parameter, at least one editing rule or parameter for controlling creation of an automatic media remix.

According to an embodiment, the at least one reference media content is a reference video clip, which is a professionally edited video clip, such as a movie, a documentary, a sport video or a music video.

According to an embodiment, the at least one stylistic parameter includes one or more of the following:
  number of shots in the reference video clip;
  effects used in shot transitions;
  shot duration;
  cinematic technique used in shots;
  audio-specific editing parameters.

According to an embodiment, the cinematic technique used in shots includes one or more of the following: shot type; color style; camera angle; number of people appearing in the shot; a static or a shaking shot; a dominating shape appearing within a frame; a direction of a dominant movement in the shot.

According to an embodiment, the audio-specific editing parameters includes one or more of the following: tempo, beats, downbeats, the music structure; amplitude peaks; amplitude valleys; slower amplitude changes; music key; music chords, occurrence of certain rhythmic patterns.

According to an embodiment, the method further comprises indexing the analysed at least one reference video clip to belong to at least one class which is identified by at least a director and/or a genre of the video clip.

According to an embodiment, the method further comprises creating an aesthetic model on the basis of the analysed at least one stylistic parameter, said aesthetic model being a director-specific or a genre-specific or an actor-specific or a producer-specific or a country-specific aesthetic model and comprising at least one editing rule or parameter for controlling creation of an automatic media remix.

According to an embodiment, a single reference video clip is used as a basis for the aesthetic model.

According to an embodiment, a plurality of reference video clips from the same director are used as a basis for the director-specific aesthetic model, or a plurality of reference video clips from the same genre are used as a basis for the genre-specific aesthetic model, or a plurality of reference video clips from the same actor are used as a basis for the actor-specific aesthetic model, or a plurality of reference video clips from the same producer are used as a basis for the producer-specific aesthetic model, or a plurality of reference video clips from the same country are used as a basis for the country-specific aesthetic model.

According to an embodiment, the method further comprises receiving a user request for creating a media remix from an event, said user request including a request to create the media remix according to a certain cinematic style; obtaining a plurality of source video clips from said event; and applying an aesthetic model corresponding to the requested cinematic style when creating an automatic media remix from said event.

According to an embodiment, the method further comprises creating a template for the automatic media remix on the basis of the aesthetic model, wherein the template comprises information for the shots of the automatic media remix, such as duration and cinematic technique used in the shots.

According to an embodiment, the method further comprises selecting segments of the source video clips for each shot of the template, wherein a segment matching to the aesthetic model is searched for each shot.

According to an embodiment, the method further comprises modifying content of the source video clips to improve the matching of a segment to the aesthetic model of a particular shot of the template.

According to an embodiment, the method further comprises carrying out the steps of creating the template for the automatic media remix and selecting segments of the source video clips for each shot of the template adjacently for each shot.

According to an embodiment, the method further comprises compiling the automatic media remix by joining the segments of the source video clips selected for each shot of the template together.

According to an embodiment, the method further comprises analysing content of the segments of the source video clips of the automatic media remix, and modifying the content of the segments of the source video clips of the automatic media remix to improve the matching of the automatic media remix to the aesthetic model, wherein the modifying includes one or more of the following: applying certain color effects according to the color styles of the aesthetic model; applying certain transitions between scene cuts according to the aesthetic model; cropping with zooming; slowing down/speeding up; mirroring the content; rocking back and forth a section; change of a lens; change of focus; freezing a frame; showing backwards; applying audio effects according to the style of the aesthetic model.

According to an embodiment, the audio effects applied according to the style of the aesthetic model are based on one or more of the following parameters:

a probability of making a video angle switch at structural boundaries, at amplitude peaks, at musical keys, or at chord changes;

a probability of using a certain shot type at different music sections;

a probability of using a specific shot transition effect with certain musical attribute values;

a probability of switching from a certain shot type to another one at different musical attributes, such as structural boundaries, amplitude peaks, or key or chord changes;

a probability of making a certain cut in a certain musical phrase;

a probability of observing a camera operation, such as panning or zoom in/out, at a musical attribute;

a probability of applying a certain video effect when observing a certain mood in the music;

a probability of applying a certain video effect at musical highlight or pause sections.

According to a second aspect, there is provided an apparatus comprising at least one processor, memory including computer program code, the memory and the computer program code configured to, with the at least one processor, cause the apparatus to at least: obtain at least one source of media content to be used as a reference media content; analyse the at least one reference media content according to at least one stylistic parameter; and determine, on the basis of the at least one stylistic parameter, at least one editing rule or parameter for controlling creation of an automatic media remix.

According to a third aspect, there is provided a computer program embodied on a non-transitory computer readable medium, the computer program comprising instructions causing, when executed on at least one processor, at least one apparatus to: obtain at least one source of media content to be used as a reference media content; analyse the at least one reference media content according to at least one stylistic parameter; and determine, on the basis of the at least one stylistic parameter, at least one editing rule or parameter for controlling creation of an automatic media remix.

According to a fourth aspect, there is provided a system comprising at least one processor, memory including computer program code, the memory and the computer program code configured to, with the at least one processor, cause the system to at least: obtain at least one source of media content to be used as a reference media content; analyse the at least one reference media content according to at least one stylistic parameter; and determine, on the basis of the at least one stylistic parameter, at least one editing rule or parameter for controlling creation of an automatic media remix.

According to a fifth aspect, there is provided an apparatus comprising: means for obtaining, by an automatic media remixing service, at least one source of media content to be used as a reference media content; means for analysing the at least one reference media content according to at least one stylistic parameter; and means for determining, on the basis of the at least one stylistic parameter, at least one editing rule or parameter for controlling creation of an automatic media remix.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIGS. 1a and 1b show a system and devices suitable to be used in an automatic video remixing service according to an embodiment;

FIG. 6 shows an exemplary user interface according to an embodiment for allowing a user to select one or more editing parameters for the automatic media remixing service to model.

DESCRIPTION OF EMBODIMENTS

As is generally known, many contemporary portable devices, such as mobile phones, cameras, and tablets, are provided with high quality cameras, which enable to capture high quality video files and still images. In addition to the above capabilities, such handheld electronic devices are nowadays equipped with multiple sensors that can assist different applications and services in contextualizing how the devices are used. Sensor (context) data and streams of such data can be recorded together with the video or image or other modality of recording (e.g. speech).

Usually, at events attended by a lot of people, such as live concerts, sport games, political gatherings, and other social events, there are many who record still images and videos using their portable devices, thus creating user generated content (UGC). A significant amount of this UGC will be uploaded to social media portals (SMP), such as Facebook, YouTube™, Flickr®, and Picasa™, etc. These SMPs have become de facto storages of the generated social media content. The uploaded UGC recordings of the attendants from such events, possibly together with various sensor information, provide a suitable framework for the present invention and its embodiments.

The media content to be used in media remixing services may comprise at least video content including 3D video content, still images (i.e. pictures), and audio content including multi-channel audio content. The embodiments disclosed herein are mainly described from the viewpoint of creating an automatic video remix from video and audio content of source videos, but the embodiments are not limited to video and audio content of source videos, but they can be applied generally to any type of media content.

Figure 1A:
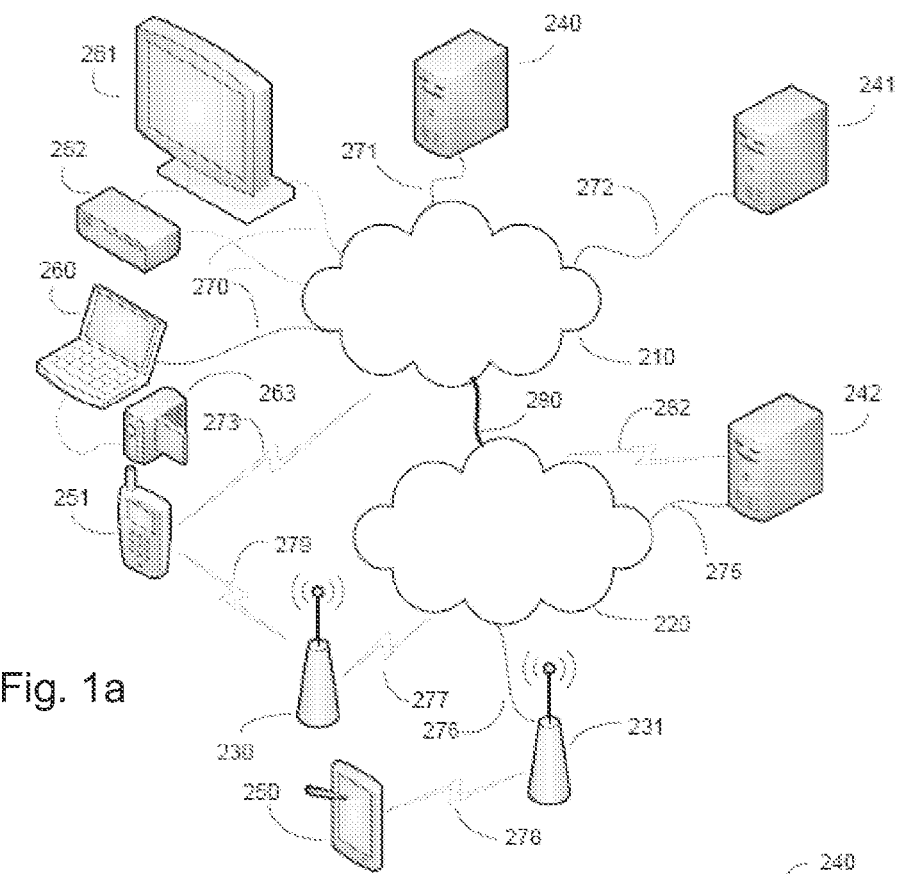
Figure 1B:
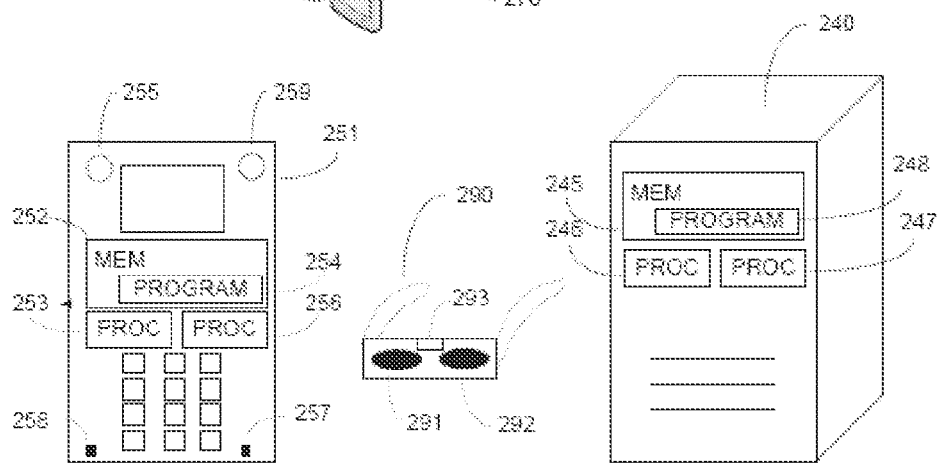

FIGS. 1a and 1b show a system and devices suitable to be used in an automatic video remixing service according to an embodiment. In FIG. 1a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 1a are shown servers 240, 241 and 242, each connected to the mobile network 220, which servers may be arranged to operate as computing nodes (i.e. to form a cluster of computing nodes or a so-called server farm) for the automatic video remixing service. Some of the above devices, for example the computers 240, 241, 242 may be such that they are arranged to make up a connection to the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 1b shows devices for automatic video remixing according to an example embodiment. As shown in FIG. 1b, the server 240 contains memory 245, one or more processors 246, 247, and computer program code 248 residing in the memory 245 for implementing, for example, automatic video remixing. The different servers 241, 242, 290 may contain at least these elements for employing functionality relevant to each server.

Similarly, the end-user device 251 contains memory 252, at least one processor 253 and 256, and computer program code 254 residing in the memory 252 for implementing, for example, gesture recognition. The end-user device may also have one or more cameras 255 and 259 for capturing image data, for example stereo video. The end-user device may also contain one, two or more microphones 257 and 258 for capturing sound. The end-user device may also contain sensors for generating the depth information using any suitable technology. The different end-user devices 250, 260 may contain at least these same elements for employing functionality relevant to each device. In another embodiment of this invention, the depth maps (i.e. depth information regarding the distance from the scene to a plane defined by the camera) obtained by interpreting video recordings from the stereo (or multiple) cameras may be utilised in the video remixing system. The end-user device may also have a time-of-flight camera, whereby the depth map may be obtained from a time-of-flight camera or from a combination of stereo (or multiple) view depth map and a time-of-flight camera. The end-user device may generate depth map for the captured content using any available and suitable mechanism.

The end user devices may also comprise a screen for viewing single-view, stereoscopic (2-view), or multiview (more-than-2-view) images. The end-user devices may also be connected to video glasses 290 e.g. by means of a communication block 293 able to receive and/or transmit information. The glasses may contain separate eye elements 291 and 292 for the left and right eye. These eye elements may either show a picture for viewing, or they may comprise a shutter functionality e.g. to block every other picture in an alternating manner to provide the two views of three-dimensional picture to the eyes, or they may comprise an orthogonal polarization filter (compared to each other), which, when connected to similar polarization realized on the screen, provide the separate views to the eyes. Other arrangements for video glasses may also be used to provide stereoscopic viewing capability. Stereoscopic or multiview screens may also be autostereoscopic, i.e. the screen may comprise or may be overlaid by an optics arrangement, which results into a different view being perceived by each eye. Single-view, stereoscopic, and multiview screens may also be operationally connected to viewer tracking such a manner that the displayed views depend on viewer's position, distance, and/or direction of gaze relative to the screen.

It needs to be understood that different embodiments allow different parts to be carried out in different elements. For example, parallelized processes of the automatic video remixing may be carried out in one or more processing devices; i.e. entirely in one user device like 250, 251 or 260, or in one server device 240, 241, 242 or 290, or across multiple user devices 250, 251, 260 or across multiple network devices 240, 241, 242, 290, or across both user devices 250, 251, 260 and network devices 240, 241, 242, 290. The elements of the automatic video remixing process may be implemented as a software component residing on one device or distributed across several devices, as mentioned above, for example so that the devices form a so-called cloud.

One or more of the computers disclosed in FIG. 1a may be configured to operate a multimedia content remix service, which can be referred to as a media mixer service (MMS). The MMS is a service infrastructure that is capable of receiving user communication requests for inviting other users. The MMS, together with the computer(s) running the service, further comprise networking capability to receive and process media content and corresponding context data from other data processing devices, such as servers operating social media portals (SMP). Herein, the term social media portal (SMP) refers to any commonly available portal that is used for storing and sharing user generated content (UGC). The UGC media content can be stored in various formats, for example, using the formats described in the Moving Picture Experts Group MPEG-4 standard. The context data may be stored in suitable fields in the media data container file formats, or in separate files with database entries or link files associating the media files and their timestamps with sensor information and their timestamps. Some examples of popular SMPs are YouTube, Flickr®, and Picasa™. It is apparent for a skilled person that the media mixer service MMS and the social media portals SMP are implemented as network domains, wherein the operation may be distributed among a plurality of servers.

A video remix can be created according to the preferences of a user. The source content refers to all types of media that is captured by users, wherein the source content may involve any associated context data. For example, videos, images, audio captured by users may be provided with context data, such as information from various sensors, such as from a compass, an accelerometer, a gyroscope, or information indicating location, altitude, temperature, illumination, pressure, etc. A particular sub-type of source content is a source video, which refers to videos captured by the user, possibly provided with the above-mentioned context information.

Any user can request from the video remix service an automatically created video remix version from the material available for the service about an event, such as a concert. The service creates an automatic cut of the video clips of the users. The service may analyze the sensory data to determine which are interesting points at each point in time during the event, and then make switches between different source media in the final cut. Audio alignment is used to find a common timeline for all the source videos, and, for example, dedicated sensor data (accelerometer, compass) analysis algorithms are used to detect when several users are pointing to the same location on the stage, most likely indicating an interesting event. Furthermore, music content analysis (beats, downbeats), is used to find a temporal grid of potential cut points in the event soundtrack.

Figure 2:
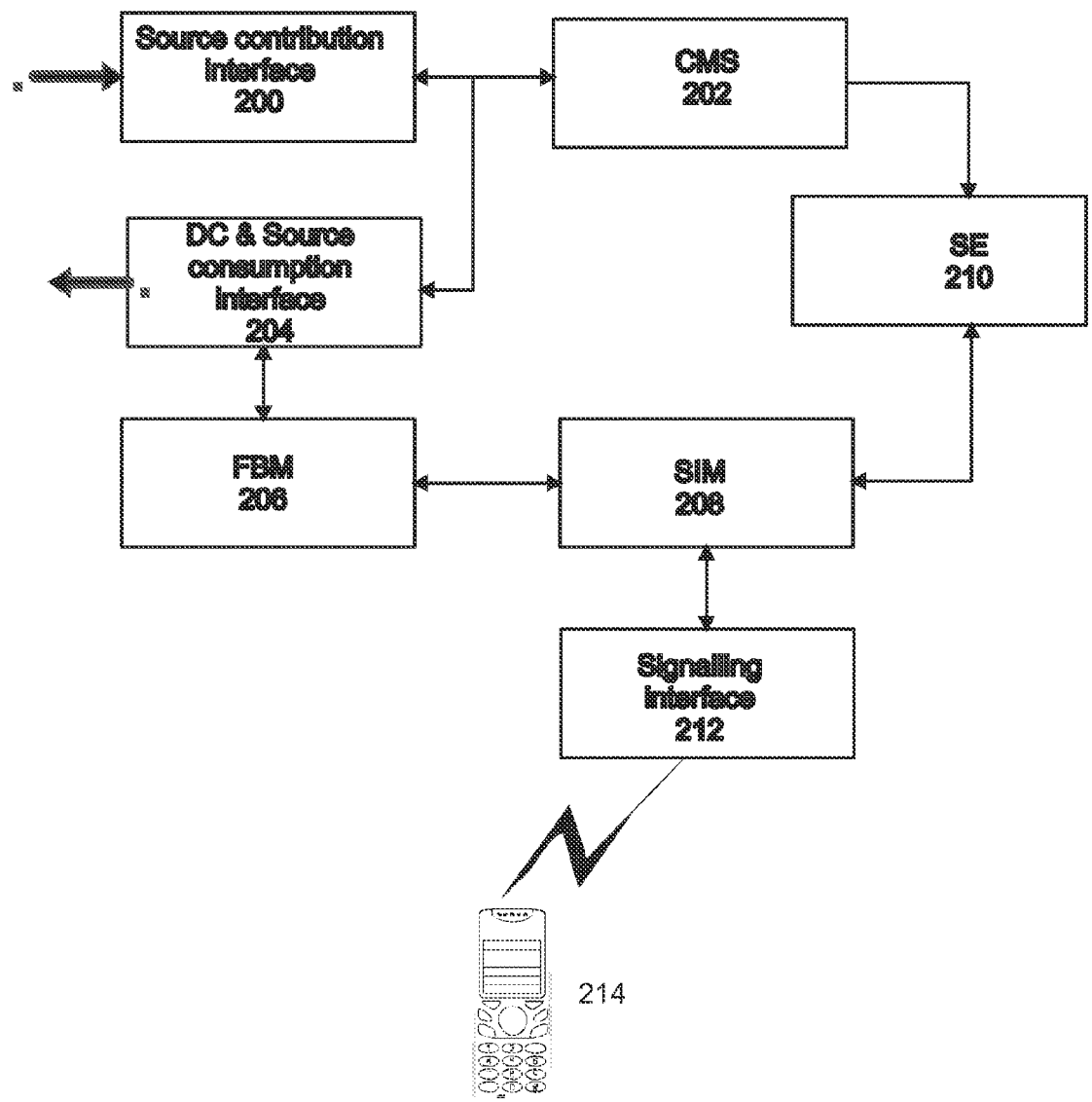
FIG. 2 shows an exemplified service architecture for creating an automatic video remix.

FIG. 2 shows exemplified service architecture for creating an automatically created video remix. The service architecture may include components, known as such from contemporary video editing services, for example an interface 200 for the users contributing their recorded content from the event, which interface may annotate the contributed content for clustering the content related to the same event for generating the video remix, a content management system (CMS; 202) to store/tag/organize the content, and an interface 204 for delivering the video remix and its related source content for the users to consume.

The service architecture of FIG. 2 may further comprise a feedback module (FBM; 206) to capture the content consumption feedback about the content contributed by the users and the video remix versions that have been generated. The feedback information may be provided to a synergistic intelligence module (SIM; 208), which contains the required intelligence or the logic required to analyze and create the information about the user contributed source content that is contributed to the service. The SIM is connected to a user apparatus 214 via a signalling interface 212, which enables the user to request a video remix to be created according to user-defined parameters and also to provide new UGC content to be used in the video remix generation process.

In the analysis the SIM may utilize, in addition to the feedback information, also information about the arrival distribution pattern of the source content. The SIM may use the UGC contribution data from past events in various locations and use it to generate a probabilistic model to predict user content contribution's arrival time (or upload time) to the service. The information provided by the SIM are received in a synergizing engine (SE; 210), which may be implemented as a separate module that interacts with the CMS, the SIM and the FBM to generate the video remix versions that match the criteria signalled by the user requesting a video remix. The information provided by the SIM enables the SE to utilize the previous video remix versions and their consumption feedback as inputs, in addition to the newly provided source content and its consumption feedback, wherein the SE changes the weights of different parameters which are used to combine the multitude of content.

For personalizing the video remixes created by an automatic video remixing service in a cinematic style defined by a user, there is provided a method comprising
    obtaining at least one video clip to be used as a reference video clip;
    analysing the at least one reference video clip according to at least one stylistic parameter; and
    determining, on the basis of the at least one stylistic parameter, at least one editing rule or parameter for controlling creation of an automatic video remix.

A user of the automatic video editing system may request a video remix from a particular event to be created according to a particular style. When creating an automatic video remix, the editing rule or parameter is applied in the automatic video editing system to create a video remix from selected source video material from said event. Finally, the video remix created according to the style determined by the editing rule or parameter may be provided to the user.

Figure 3:
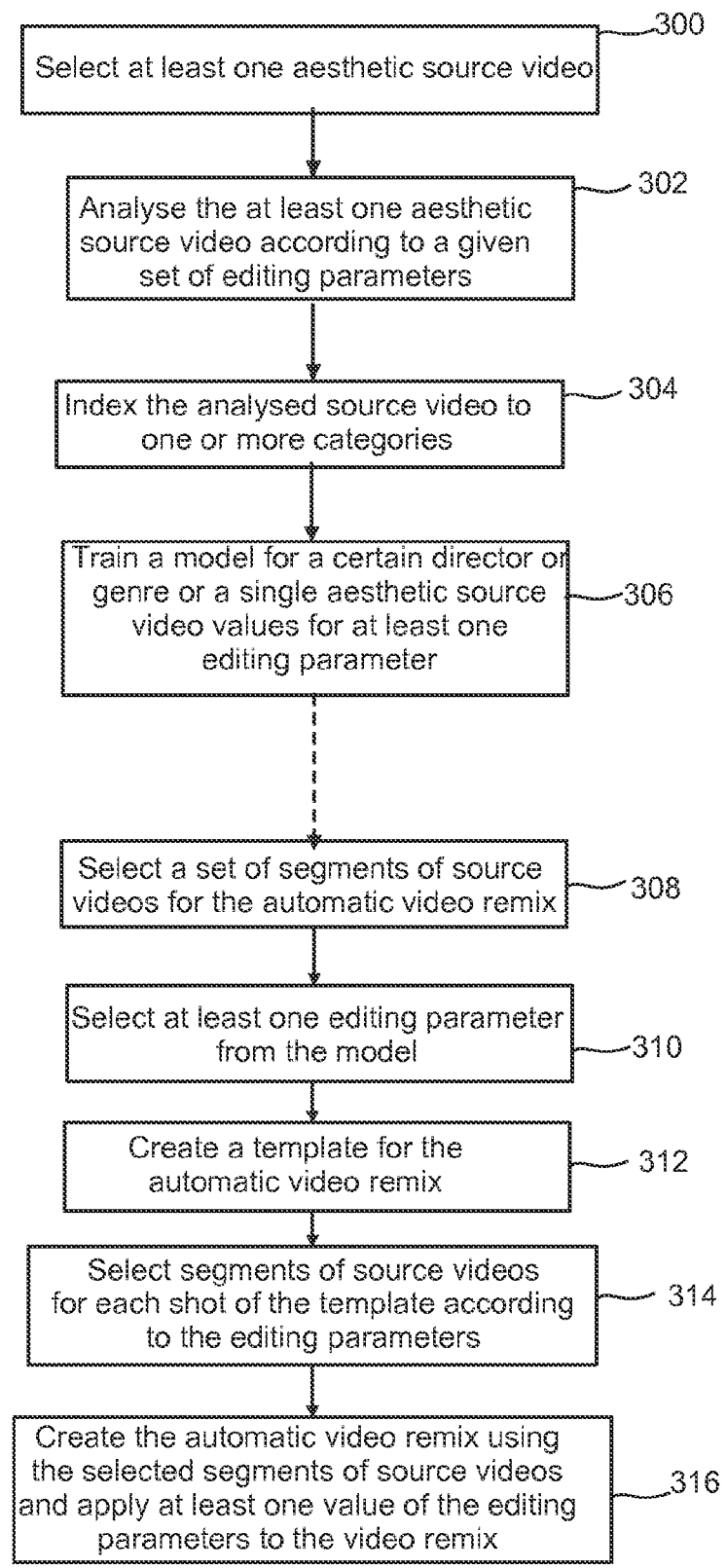
FIG. 3 shows a method for providing enhanced content information for a video remix according to an embodiment.

FIG. 3 shows a simplified operation flow, wherein the operation is divided in two aspects, i.e. the first aspect of determining an editing model for a particular cinematic style and the second aspect of creating an automatic video remix according to the style determined by a user.

Herein, the following terminology is used to describe the implementation of the embodiments: "an aesthetic source video" is a reference video clip used as model for creating an automatic video remix; "an (automatic) video remix" is a video obtained from a set of input source videos processed by a system; and "a source video" is either user generated video content or any publicly available media content used for generating an automatic video remix.

For obtaining a reference cinematic style model, one or more existing, professionally edited media clips are selected (300) as "aesthetic source videos". The aesthetic source videos can be any kind of videos, such as movies, documentaries or music videos. The automatic video remix service may obtain the aesthetic sources automatically, e.g., by accessing the movie titles watched by users of the automatic video remix service from an online service, such as imdb.com, and then obtaining the content from an online video store, for example.

Along with the aesthetic source videos, there is typically metadata relating to the source video, such as information on the director, producer, genre, country of production, etc. This metadata may be used later on, when indexing the source videos.

Figure 4A:
FIGS. 4a and 4b show an exemplary user interface according to an embodiment for allowing a user to select the style to be applied when creating an automatic media remix.
Figure 4B:

FIGS. 4a and 4b depict an exemplary user interface of a service or application which would allow a user to select the style to be applied when creating an automatic video remix.

In the example of FIG. 4a, the user is able to select among types of information (director, genre, producer, country of production, actor(s)) which he would like to provide for the system as the input for the aesthetic model. For example, in this case the user may select the Director option, behind which he may see a list of directors known in the system, as shown in FIG. 4b, and make a selection among these. In the example of FIG. 4b, the user has selected the imaginary director Kim Smith.

The user may select a single director, in which case the system would obtain and use a model related to this particular director. The user may also select more than one director, in which case the system could obtain a model combining the styles of these two directors, and/or alternate between the styles of these two directors in the created video remix.

In the example user interface of FIG. 4b the names and pictures of directors are shown. In addition, the system may show additional information, such as links to director's Web pages in online services such as imdb.com or other additional information related to the director and his/her style.

Alternatively or in addition, the user of the service may provide the automatic video remix service with one or more example videos to be used as aesthetic source videos. For example, the user may provide a network address of a video, such as a Uniform Resource Locator (URL) of a Youtube video, upon which the video remix system may download or otherwise access the source video for further analysis.

Figures 5A, 5B, 5C:
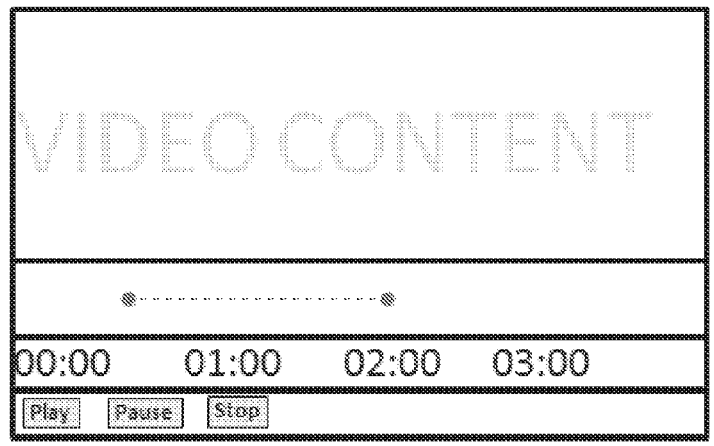
FIGS. 5a-5c show exemplary user interfaces according to an embodiment for allowing a user to input reference source videos to the automatic media remixing service.

FIGS. 5a, 5b and 5c depict an exemplary user interface allowing the user to input example video(s) to the system. In the example of FIG. 5a, the user is able to select a video file from the local file system of his computer to be uploaded to the service. After the user makes his selection, the file is uploaded to the service, analysed by the service, and used as the aesthetic source for video editing parameters. In the example of FIG. 5b, the user is able to provide the address to an online video. According to an embodiment, the user may be able to indicate one or more segments of the provided example video(s) to be used when creating the aesthetic model. In the example of FIG. 5c, the user is able to view the video he uploaded or is about to upload or otherwise select. From the view, the user is able to indicate a certain section or time interval, from which the user would like the model parameters to be obtained by the system. In the example case, the user has provided the time interval from approximately 20 seconds until two minutes to be used.

Alternatively or in addition, if the video remix system is implemented by a media service provider, a video catalog stored in a server of the media service provider may be accessed to obtain the source video for further analysis or to find predetermined editing parameters of the source video. It is also possible to annotate source videos manually. In particular, crowdsourcing may be applied to obtain a set of annotations for a catalogue of videos.

The user of the video remix service may provide the video remix system with information about his/her favourite director, genre, movie etc. The user may, for example, tag a director as his/her favourite in an online service, or the user may rate a particular movie as the highest, and the video remix service may then determine the director of that movie as the favourite of user. This may be used as a default setting for the user, unless no other favourite information is provided.

According to an embodiment, instead of using professional material as the aesthetic source material, also non-professional video material can be used. For example, such material may be obtained from people participating in social networks or directly from the video remix service. Let us suppose a user, who is rather active and popular regarding the videos submitted by him/her in the Youtube™, but the actual content of the videos may still be very amateurishly edited. Nevertheless, said user may still have a specific style that he/she follows when creating his/her videos, which style could be analysed and modelled by the system. If popular enough, such a style may be allowed to be used by other users in creation of their automatic video remixes. Such amateur video content may lack some reference data/information, such as director or producer, but the video content can still be analysed regarding the automatic editing parameters.

Referring back to FIG. 3, for the arbitrary number N (N=>1) of media clips (aesthetic source videos), a video analysis is performed (302) according to a given set of editing parameters. An aesthetic source analyzer module of the video remix system analyses the media clips to find editing parameters, which are utilised in creating models for various directors or cinematic styles, such as concert, sport, club, private party, action, horror, romantic, comedy, etc. Media clips in the aesthetic source database and user-provided source videos may be analysed according to at least one of the following editing parameters:

the number of shots in the media clip; A 'shot' can be defined as a camera angle view delimited by a following camera angle view (starting the next shot). The number of shots in the media clip may be determined by applying known methods of automatic shot boundary detection. A plurality of shots may be grouped into scenes. If the number of shots is the only parameter to be analysed, then when applied to a multi-angle source material, this would determine the number of shots in the final cut.

the effects used in shot transitions; This can be determined by obtaining additional information from the shot boundary detection algorithm regarding whether the transition was instantaneous or gradual, indicating the use of a fade out/in. A direct cut between two shots may also be considered as a transition.

the length of each shot;

the cinematic technique used in each shot; The cinematic techniques may include, for example:

the shot type (e.g. close-up, medium shot, long shot); According to an embodiment, the shot type may be determined by applying face detection/recognition on the source video and comparing the size of the detected face to the video frame size. If the size is above a predetermined threshold, the shot is determined as a close-up shot, otherwise as a medium shot or a long shot. According to another embodiment, when the shot type is analysed from a user-provided source video, a combination of one or more of location data, compass orientation, a model of event setting, and camera zoom settings may additionally be used to determine whether the shot is a close-up, a medium shot, or a long shot. For example, if the user is not using zoom it is likely that the shot is medium shot or long shot. If the user is far from the object to be captured, the shot is more likely a long shot instead of a medium shot.

the color style; According to an embodiment, this can be obtained by histogramming the colors from the video frames. In particular, it may be determined whether the color style is black and white, certain tint, few colors vs. multiple colors in shot, use of particularly bright colors, or particularly dim.

the camera angle; e.g. bird's eye view, high angle, same level, low angle, crane view. According to an embodiment, the camera angle may be analysed based on the tilt angle of the device, obtained as the angle between the detected gravity vector and the gravity vector at zero tilt.

the number of people appearing in the shot; If the people are facing the camera, known techniques of face detection/recognition can be used to detect the faces in the video frame and count their number.

a static shot vs. a shaking shot; or a stationary shot vs. a handheld shot; According to an embodiment, this can be analysed using video analysis for aesthetic source videos and/or accelerometer/compass/gyroscope data analysis for user-provided source videos. For example, if the magnitude of accelerometer data exceeds a predefined threshold, the shot can be determined a shaking shot.

a dominating shape within the frame (e.g. circular, vertical, horizontal, triangular, rectangular, organic). This can be analysed by applying known methods for object segmentation on the video frames, obtaining the largest/most dominant shape, and then comparing the detected shape against a set of template shapes.

a direction of a dominant movement in the shot (X, Y or Z-axis). According to an embodiment, this can be obtained as directions of video motion vectors for aesthetic source videos and as a combination of motion vector directions and device gyroscope data for user-provided source videos.

the style of title sequence and end-titles; According to an embodiment, differences in the style of title can be made based on e.g. font type, size and color, scrolling or stationary text; background color or texture; omission or inclusion of title sequences.

In addition to the above video-specific editing parameters, the media clips in the aesthetic source database may be analysed according to audio-specific editing parameters. Especially, musical attributes of the media clips may be analysed according to at least one of the following editing parameters:

tempo, beats, and downbeats;
the music structure, including, for example, the intro, verse, chorus, bridge, outro;
amplitude peaks, corresponding to, for example, loud drum hits;
amplitude valleys, corresponding to, for example, pauses between or inside songs;
slower amplitude changes, including crescendo, decrescendo;
music key;
music chords
certain rhythmic patterns;
instrumentation (e.g. dominant instrument or singing);
genre.

The analysis may be carried out by any prior known analysis method. For example, Papadopoulos, Peeters, "Joint estimation of chords and downbeats from an audio signal", Audio, Speech, and Language Processing, IEEE Transactions on 19, 1 (2011) 138-152 discloses a method for estimating the beats, downbeats, and chords from music content. Yeo, Dong-Gyu; Kim, Byeong Man; Lee, Hae-Yeoun, "Automatic Music Mood Detection through Musical Structure Analysis", 2nd International Conference on Computer Science and its Applications, 2009, CSA '09 discloses a method for automatic analysis of music mood. These and any other known methods may be utilised in analysing the musical attributes.

In addition to shot-specific features, some analysis may be performed on a time scale which is not related to shots. For example, switching patterns on sections of the movie which contain music may be analysed.

Wherever the soundtrack contains music, the music is analysed to determine the times of beats and downbeats using methods known in the art. The locations of shot boundaries with respect to each musical measure are collected to be used as a model for switching patterns for the director of the movie.

A shot switching time pattern refers to times in relation to musical meter (beats, downbeats, musical structure) of angle switches in the movie. For example, on many music videos the professional directors may favour making an angle switch on the first beat of a measure, that is, the downbeat. Such a switching pattern could be analysed and characterized, for example, with the representation [1 0 0 0], where the four numbers represent the four beats of a measure in a 4/4 time signature. Different lengths of patterns could be developed for different time signatures, for example, a pattern of length three for a music in ¾ time signature. In the pattern, 1 indicates that there is an angle switch on the beat and 0 indicates that there is no angle switch.

For example, the model may simply be of the form:
[1 0 0 0] (switch on the first beat of a measure)
[0 1 0 0] (switch on the second beat of a measure)

Along with the found patterns, there may be a count indicating how many times the switching pattern occurred in the media clip (movie) in question (or all the media clips of the same director). Moreover, the counts may be normalized such that they sum to unity to get a probability for each switching pattern. Even further, a transition probability may be obtained by counting the number of occurrences from each found switching pattern to all other patterns to get a statistical model of switching patterns and transitions between them.

According to an embodiment, the user may control which aspects are to be modelled by the system. FIG. 6 depicts an exemplary user interface, where the user is able to select one or more editing parameters which he/she wishes the system to model. If the user selects only certain parameters, only or at least those parameters are then modelled according to the chosen style and the remaining editing decisions will be carried out by the video remix system according to its normal logic. The user may also select several editing parameters to be modelled. The user interface in FIG. 6 may have several levels (not shown). For example, if the user selects "Audio-specific editing" from the first level, then a list of the available audio-related editing parameters may be displayed to the user as the next level, thereby providing the user with an option to select among the displayed parameters.

Next in FIG. 3, each of the analysed N aesthetic source videos may optionally be indexed (304) as belonging to one of M<N classes. Thus, the aesthetic source videos may be indexed at least according to the director and/or producer name ("Spielberg", "Tarantino", "Chaplin", etc.) and/or genre (concert, club, sport, private party, romantic, comedy, horror, action, war, western, etc.). The indexing may also be related to actor(s) of the movies. For example, often the movies by certain famous actors may have a certain style even if the director, producer, or country of production varies. The indexing may be manual or based on tags, for example such that each aesthetic source video may include a tag with the name of the director or the producer or the actor.

For creating aesthetic models for the directors of the media clips, M directors models are trained (306) with the aesthetic source videos contained in each class. The result is M training models for M directors. Instead or in addition, aesthetic models can be similarly created for genres, actors, producers, or countries or production resulting in at least one training model for each genre, actor, producer, or country or production.

According to an embodiment, a single aesthetic source video is used as the source for editing rules and/or parameters when making the automatic video remix. This means that for each director there may be several models, one corresponding to each movie he/she has directed.

According to another embodiment, an aggregate statistical model is made for each distinct director or cinematic style corresponding to a video genre, actor, producer, or country of production in the indexed aesthetic source material. For example, the aggregate model for a style will summarize the general statistics for this style, describing, for example:
what is the proportion of different shot types on average in the movies belonging to this style;
what is the proportion, over time, of different shot types on average in the movies belonging to this style;
what are the different color styles;
what are the typical shot switching time patterns used in the movies belonging to this style in parts where the soundtrack contains music.

Regarding the extracted musical attributes and video parameters, the general statistics may describe, for example:
a probability of making a video angle switch at structural boundaries, at amplitude peaks, at musical keys, or at chord changes. The probability can be obtained by counting the number of shot boundaries found in the aesthetic source video on the corresponding musical sections.
a probability of using a certain shot type at different music sections, for example the probability of using close-up during chorus;
a probability of using a specific shot transition effect, such as sharp cut, fade in/out, dissolve or wipe, with certain musical attribute values. For example, sharp cuts may be used in songs with fast tempo, and fading out may be used at the end of the song.
a probability of switching from a certain shot type to another one at different musical attributes, such as structural boundaries, amplitude peaks, or key or chord changes. For example, if in the aesthetic source, when performing a key modulation a switch from a close-up to a wide angle is made, then such a rule is learned.
a probability of making a certain cut in a certain musical phrase, for example, when encountering the chord progression VI-V-I. For example, based on the analysed material the system may learn a rule that when the band plays the tonic chord I, the professional directors often switch to the master shot of the stage.
a probability of observing a camera operation, such as panning or zoom in/out at a musical attribute. For example, it may be common for a director to use a zoom in or out whenever the music amplitude is increasing or decreasing, or tilt the camera up or down when the pitch of a dominant instrument is ascending or descending.
a probability of applying a certain video effect when observing a certain mood in the music. For example, when the music is romantic, some directors may apply blurring effect or add pink shade.
a probability of applying a certain video effect at musical highlight, such as many adjacent amplitude peaks, possibly coinciding with key modulation, or pause sections. As an example, if the aesthetic source video utilizes slow motion and/or depicts a still image during song pauses, the automatic video remix will have the same effect during one or more song pauses.

The model may include editing rules and/or editing parameters for the automatic video remix. The editing rules may describe general guidelines for creating the video remix, whereas the editing parameters may set specific values for certain variables of the video remix.

An example of an editing rule could be:
after an establishing shot, always cut to a close-up of a person
use a wide-angle shot as the establishing shot
An example of an editing parameter could be
80% of the shots should be extreme close up
20% of the beat-synchronous switching patterns should be [1 0 0 0]; i.e. switching angle at the downbeat A second aspect of the invention relates to creating an automatic video remix according to the editing rules and/or parameters of a stylistic model. The previous analysis steps may be carried out as pre-processing steps, when the system receives a request from a user to create an automatic video remix, or as a background process whenever the system receives new professionally created media clips of various directors and/or new source material.

In the following, some embodiments are described as creating a stylistically customized video remix from source videos relating to a music concert. It is apparent for a skilled person that the same principles are applicable to any other social events, such as sports events, family events such as weddings, political gatherings, cultural events, and the like.

First the system obtains (308) a set of multi-angle source videos captured during an event, for example during a single concert. This contains the audio track obtained by joining together the audio tracks of one or more devices and all the videos from various angles (different mobile devices) at different points in time. All the videos are time-synchronized, and the goal of the system is to determine what angle to show at different points in time.

A model, for example a director model or genre model, or simply one or more editing parameters of a model is selected (310) to be applied in the new automatic video remix. The model may be set by the user or as a default setting. Alternatively, the director model may be selected automatically, for example, based on the date. For example, if a director has a birthday on the day when the automatic video remix is created, his model should be preferably applied by default. Additionally, links to director information and/or discography may be included into the created automatic video remix or on the user interface of the automatic video remix service.

Based on the selection, the system is controlled to use either a single aesthetic source video, or the aggregate model comprising statistically determined ruleset of editing styles.

The system creates (312) a template for the new automatic video remix. The template includes information for creating the automatic video remix, such as:
shot 1: duration, used cinematic technique
shot 2: duration, used cinematic technique
. . .

shot T (last shot): duration, used cinematic technique

If the aesthetic source video was a single media file (e.g. a particular movie), then the shot durations and used cinematic techniques may be selected based on that.

If an aggregate statistical model is used instead of a single aesthetic source, the system may randomly select a set of shot durations and techniques from the statistical model. In particular, in the case of the music specific switching pattern model the operation may be as follows:

randomly select an initial switching pattern, weighted by the prior probabilities obtained in the training phase. The selected pattern may be, e.g., [1 0 0 0]

randomly select the second pattern, weighted by the transition probabilities from this pattern to all the other patterns.

continue selecting next patterns similarly until enough patterns have been obtained.

Weighted randomized selection above refers to a mechanism, where the selection is done such that the distribution of randomly selected values follows a predefined, in this case learned, probability distribution. For example, if the model has learned two switching patterns, [1 0 0 0] and [0 1 0 0], and their prior probabilities are 0.8 and 0.2, respectively, then the output of the random selection will be such that 80 percent of the selections will be of pattern [1 0 0 0] and 20 percent of the selections will be of pattern [0 1 0 0]. Such a mechanism may be implemented, for example, by dividing a certain range in appropriate proportions for the values and then drawing randomly numbers uniformly from the range. For example, in this case the interval [0, 1] may be divided such that the interval [0, 0.8) corresponds to the pattern [1 0 0 0] and the interval [0.8,1] corresponds to the pattern [0 1 0 0]. Then, values are randomly drawn uniformly from the interval [0, 1], and the pattern corresponding to the drawn value is selected.

Then the most suitable camera angles (i.e. segments of a source video) are selected (314) to occupy each shot. Accordingly, for each shot, one segment of a source video is selected based on best match between the aesthetic source video and the source video. When selecting the best match between the aesthetic source video and the source video, the system compares the used cinematic technique between possible candidates and selects the one to be used based on best matches. For example, if the aesthetic source video contains a wide angle, then it is preferable to select a segment of a source video also containing a wide angle shot. The determination may be performed, for example, based on similarity of at least one of a shot type, stability, a dominating shape, and/or any other attribute determined in the analysis phase.

It should be noted that source videos to be used in the video remix may obtained as multiview (multi-angle) video content. For selecting the most suitable camera angle for each slot, the analysis is performed also for the multi-angle source material. For the multi-angle source material, the shot type may have been determined for example, based on the sensor data. Not all attributes analyzed for the aesthetic source video need to be available for the multi angle source material. For example, the source video usually comprises only a single shot, whereupon transitions between the shots need not be analysed.

According to an embodiment, the content of source videos may be made better match to the aesthetic source via content modification. For example, a non-matching color type of the selected multi angle source video can be made to match the aesthetic source via color effects. For example, if the aesthetic source is in black-and-white but all the content of the source video is in color, the content can be transformed to black-and-white.

According to an embodiment, the above steps of creating (312) a template and selecting (314) the most suitable camera angle (a segment of a source video) may be carried out adjacently for each shot. For example, the system may start by selecting a template for shot 1, select the most suitable camera angle for it, then select the template for short 2, and so on.

The above described approach may be characterized as maximal, as it tries to select the best source video segment for each shot in the template. In some cases, this may not be an optimal approach in terms of the overall quality of the automatic video remix. According to an embodiment, the system may also analyse the overall quality of the automatic video remix before making the final editing. For example, the system may create several alternative templates and/or selection sequences for source video segments, and evaluate a goodness criterion for each. Finally, the automatic video remix may be produced from the template and the selection sequence for source video segments which gives the best value for the goodness criterion. A goodness criterion may measure, for example, how well the attributes of the selected source video segment matches the selected editing parameters. This may be an average of the percentage of match between the shot attributes and the editing parameters.

For example, if the template indicates the following shot type sequence: [wide angle; medium angle; close up; medium angle; extreme close up] and a possible selection sequence of the source video segments has the attributes and match percentages: [wide angle 100%; medium angle 100%; extreme close up 75%; wide angle 75%; medium angle 50%], then this would result in giving an average goodness score of 80%.

It is also possible to emphasize the editing rules and/or editing parameters linked specifically to the musical attributes. Thus, a more detailed music analysis is performed for the soundtrack selected for the automatic video remix to be generated. The same music attributes which were analysed from the aesthetic source are analysed from the soundtrack.

According to an embodiment, instead of analysing the soundtrack of the video remix to be generated, the system can analyse the soundtrack of the source videos to be used in the automatic video remix, and obtain the music parameters for the automatic video remix soundtrack from the music parameters of the source video soundtracks. This is a straightforward approach, since before the automatic video remix can be generated, the source video soundtracks need to be put to the same timeline using methods of crosscorrelation. Since the automatic video remix soundtrack is created by concatenating pieces of the source video soundtracks, it is possible at the same time pick the music parameters from the pre-analysed source video soundtracks instead of the completed automatic video remix soundtrack.

It is noted that the analysis of the source material (source videos, their soundtracks) and the soundtracks to be used for video remixes may happen as a background process, for example, whenever new source content is uploaded or otherwise made available to the system, or whenever a new soundtrack for a video remix is being created.

When creating the video remix, whenever a certain music attribute is encountered in the automatic video remix soundtrack, the learned model is consulted to find video editing parameters or parameter sequences associated with that music parameter. For example, if there is a certain chord progression encountered in the soundtrack, the model is consulted to find whether there is a certain video editing rule associated with the chord progression. If there is an associated rule, then the rule is applied if suitable source media is found.

For example, if the model indicates that a switch from close-up to wide-angle should be made when encountering the progression, then the available source media files are checked whether there is suitable content such that close-up could be shown before progression and wide angle after the progression.

If there is a certain probability for a video editing rule associated with a music attribute found from the soundtrack, then the video editing rule is applied with that probability. This allows the system to create varying cuts at different times, defined by the probabilities. For example, let us suppose that the model associated with this style has learned a probability that when the band plays the tonic chord I, the video switches to the master shot of the stage in 60 percent of the switches coinciding with the tonic chord I. As a result, the system attempts to make such as switch in 60 percent of the times when the tonic chord I is encountered in the video remix soundtrack.

Finally, the system assembles (316) the automatic video remix from source material based on selected "aesthetic source" by joining together the selected source video segments and making cuts at the selected times. In this stage, certain director specific parameters may be optionally applied to make the automatic video remix more closely match the cinematic style. These may include at least one of the following:

applying certain color effects according to the found color styles. For example, if sections in the aesthetic source were in black-and-white, the created video remix may also be transformed into black-and-white applying certain transitions between scene cuts according to the aesthetic source cropping with zooming slowing down/speeding up mirroring the content rocking back and forth (looping a section)

change of a lens change of focus freezing a frame showing video in reverse direction applying audio effects according to the style of audio effects applied in the aesthetic source. For example, the audio track may be heavily compressed, if the aesthetic source uses heavily compressed soundtracks (such as a Michael Bay movie), or echoes may be applied, if the aesthetic source has lots of echo (as in a David Lynch movie);

generating title sequence and/or end titles.

According to an embodiment, timeline modifications can be made to the source video segments based on characteristics of the aesthetic source video. The following embodiments describe some examples relating to timeline modifications.

According to an embodiment, movie characteristics may be mapped to music aspects, wherein segments of the aesthetic source video are analysed for style, such as: music concert, dance club, sport, action, chase, romantic, conversation, etc. The analysis may be based on existing methods for audio analysis. In addition, methods of automatic music analysis can be applied to obtain information on the mood of the soundtrack of the aesthetic source video, such as aggressive, romantic, smooth, mellow, etc.

Similarly, source video material, for example different songs in a concert, are analysed for similar aspects, including style and genre (rock/pop/jazz/classical/metal/electronic/etc.) and mood. Now when compiling the timeline of the automatically created video remix, the songs in the prepared video remix may be rearranged such that they better fit the movie style. The mapping may be carried out, for example, between movie scene styles and music genres where, e.g. an action scene in a movie is mapped to a rock song, or between movie scene styles and moods where, e.g. an aggressive section in movie is mapped to an aggressive song. Hence, the mood and style of the automatic video remix soundtrack represent the movie mood and style evolution.

According to a further embodiment, sections inside a single song played in the musical event may even be rearranged to match the mood and style of the aesthetic source video soundtrack. That is, the chorus/intro/bridge/outro sections of a song may be arranged to switch places to better fit the stylistic aspects of the aesthetic source. The song sections may be obtained using known song structure analysis methods.

According to an embodiment, movie timeline characteristics may be mapped to music characteristics, where "timeline tricks" used by the director of the aesthetic source movie (i.e. non-linear storyline where some events that happen, e.g. in the middle in the movie time are placed into the beginning) are mapped to the music of the video remix. For example, some songs from the middle of the concert may be placed first, if such an effect was used in the aesthetic source movie.

In another embodiment, if the aesthetic source movie video shows some past events (e.g. movie events happening in current time but some parts show events from the 1980's), this may be replicated in the music rearrangement as well. Therein, songs from the corresponding decade, or close to it, may be taken from music videos of old concerts of the artist and inserted in the performance of the video remix. This creates a similar flashback type effect that may be used by directors in professional movies.

According to an embodiment, the user may select at least two movie styles to be emulated and a mode, such as "transition" or "alternating", to change between the styles. In the transition mode, the cut style makes a transition from the first movie style to the second style and possibly to further styles. For example, if romantic comedy and horror are selected as styles and transition as mode, the system starts by emulating the imagery and cut rate of romantic comedies and gradually makes the style resemble more horror movie style. The last part of the cut may be cut as in a horror movie, e.g., scene bouncing back and forth recklessly.

In the alternating mode, the system alternates between the styles. For example, in a concert the video for each song may be cut with different style.

According to an embodiment, if the aesthetic source movie video comprises cinematic highlights, these can be simulated in the automatic video remix as well. For example, if a director using frequently explosions as highlights in his/her movies (such as Michael Bay) is used a model, each explosion highlight is shown twice. First the explosions may be shown normally, then in close-up and slow motion, for example.

The above embodiments have been described as implemented in a client-server-type video remix service. However, the implementation is not limited to client-server-type system, but according to an embodiment, the video remix service may be implemented as peer-to-peer-type system, where the processing steps described above are performed on one or more mobile devices.

In yet another embodiment, the system is client-server, but at least some of the steps described above are performed on the mobile client device.

A skilled man appreciates that any of the embodiments described above may be implemented as a combination with one or more of the other embodiments, unless there is explicitly or implicitly stated that certain embodiments are only alternatives to each other.

The above embodiments have been described as implemented with multi-angle source material. However, the implementation is not limited to such scenarios only. According to an embodiment, the invention may be implemented for remixing a single angle video file, such that the video file is remixed according to a cinematic style learned from one or more aesthetic source videos. In this case, angle switching may be replaced with switching to different frames in the video, for example, such that the system creates a video summary where the remix switches to different temporal locations of the input video at a switching rate defined by the model. As another example, the use of effects is fully applicable as well such that the user provided single-angle input video may be processed with video effects learned from a model. According to a further embodiment, the input may be stereoscopic (2-view), or multiview (more-than-2-view) video. Furthermore, although many embodiments have been described in related to video material, the invention is applicable to still images and the creation of music synchronized slideshows as well.

The various embodiments may provide advantages over state of the art. For example, more artistic quality may be provided to the automatically created video remixes. The possibility for a user to select a movie director, a movie genre, an actor, a movie producer, or a movie country of production as the style for creating the video remix may help the user to begin using the system in the first place. By implementing at least some of the embodiments, the creating of video remix is significantly facilitated, since a user only has to define as inputs the source material and the movie director/genre/actor/producer/country of origin to be used as a model.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining, by an automatic media remixing service, at least one source of media content to be used as a reference media content;
   receiving a selection associated with at least one stylistic parameter from a user;
   analyzing the at least one reference media content according to at least one stylistic parameter characteristic to said at least one reference media content; and
   determining, on the basis of the at least one stylistic parameter characteristic to said at least one reference media content and analysis of the at least one reference media content according to the at least one stylistic parameter, at least one editing rule or parameter for controlling creation of an automatic media remix by analyzing sensory data to determine one or more points in time indicative of an event of interest in order to make switches between different aesthetic sources of media content to be used in the automatic media remix.

2. A method according to claim 1, wherein
   the at least one reference media content is a reference video clip, which is a professionally edited video clip, such as a movie, a documentary, a sport video or a music video.

3. A method according to claim 2, wherein
the at least one stylistic parameter includes one or more of the following:
number of shots in the reference video clip;
effects used in shot transitions;
shot duration;
cinematic technique used in shots;
audio-specific editing parameters.

4. A method according to claim 3, wherein
the cinematic technique used in shots includes one or more of the following: shot type; color style; camera angle; number of people appearing in the shot; a static or a shaking shot; a dominating shape appearing within a frame; a direction of a dominant movement in the shot.

5. A method according to claim 3, wherein
the audio-specific editing parameters includes one or more of the following: tempo, beats, downbeats, the music structure; amplitude peaks; amplitude valleys; slower amplitude changes; music key; music chords, occurrence of certain rhythmic patterns.

6. A method according to claim 2, further comprising
indexing the analysed at least one reference video clip to belong to at least one class which is identified by at least a director and/or a genre of the video clip.

7. A method according to claim 2, further comprising
creating an aesthetic model on the basis of the analysed at least one stylistic parameter, said aesthetic model being a director-specific or a genre-specific or an actor-specific or a producer-specific or a country-specific aesthetic model comprising at least one editing rule or parameter for controlling creation of an automatic media remix.

8. A method according to claim 7, wherein
a single reference video clip is used as a basis for the aesthetic model.

9. A method according to claim 7, wherein
a plurality of reference video clips from the same director are used as a basis for the director-specific aesthetic model, or a plurality of reference video clips from the same genre are used as a basis for the genre-specific aesthetic model, or a plurality of reference video clips from the same actor are used as a basis for the actor-specific aesthetic model, or a plurality of reference video clips from the same producer are used as a basis for the producer-specific aesthetic model, or a plurality of reference video clips from the same country are used as a basis for the country-specific aesthetic model.

10. An apparatus comprising at least one processor, and memory including computer program code, the memory and the computer program code configured to, with the at least one processor, cause the apparatus to at least:
obtain at least one source of media content to be used as a reference media content;
receive a selection associated with at least one stylistic parameter from a user;
analyze the at least one reference media content according to at least one stylistic parameter characteristic to said at least one reference media content; and
determine, on the basis of the at least one stylistic parameter characteristic to said at least one reference media content and analysis of the at least one reference media content according to the at least one stylistic parameter, at least one editing rule or parameter for controlling creation of an automatic media remix by analyzing sensory data to determine one or more points in time indicative of an event of interest in order to make switches between different aesthetic sources of media content to be used in the automatic media remix.

11. An apparatus according to claim 10, wherein
the at least one reference media content is a reference video clip, which is a professionally edited video clip, such as a movie, a documentary, a sport video or a music video.

12. An apparatus according to claim 11, wherein
the at least one stylistic parameter includes one or more of the following:
number of shots in the reference video clip;
effects used in shot transitions;
shot duration;
cinematic technique used in shots;
audio-specific editing parameters.

13. An apparatus according to claim 12, wherein
the cinematic technique used in shots includes one or more of the following: shot type; color style; camera angle; number of people appearing in the shot; a static or a shaking shot; a dominating shape appearing within a frame; a direction of a dominant movement in the shot.

14. An apparatus according to claim 12, wherein
the audio-specific editing parameters includes one or more of the following: tempo, beats, downbeats, the music structure; amplitude peaks; amplitude valleys; slower amplitude changes; music key; music chords, occurrence of certain rhythmic patterns.

15. An apparatus according to claim 11, further comprising computer program code configured to, with the at least one processor, cause the apparatus to at least:
index the analysed at least one reference video clip to belong to at least one class which is identified by at least a director and/or a genre of the video clip.

16. An apparatus according to claim 11, further comprising computer program code configured to, with the at least one processor, cause the apparatus to at least:
create an aesthetic model on the basis of the analysed at least one stylistic parameter, said aesthetic model being a director-specific or a genre-specific or an actor-specific or a producer-specific or a country-specific aesthetic model comprising at least one editing rule or parameter for controlling creation of an automatic media remix.

17. An apparatus according to claim 16, wherein
a single reference video clip is used as a basis for the aesthetic model.

18. An apparatus according to claim 16, wherein
a plurality of reference video clips from the same director are used as a basis for the director-specific aesthetic model, or a plurality of reference video clips from the same genre are used as a basis for the genre-specific aesthetic model, or a plurality of reference video clips from the same actor are used as a basis for the actor-specific aesthetic model, or a plurality of reference video clips from the same producer are used as a basis for the producer-specific aesthetic model, or a plurality of reference video clips from the same country are used as a basis for the country-specific aesthetic model.

19. An apparatus according to claim 16, further comprising computer program code configured to, with the at least one processor, cause the apparatus to at least:
receive a user request for creating a media remix from an event, said user request including a request to create the media remix according to a certain cinematic style;
obtain a plurality of source video clips from said event; and apply an aesthetic model corresponding to the requested cinematic style when creating an automatic media remix from said event.

20. A non-transitory computer readable medium storing a computer program, the computer program comprising instructions causing, when executed on at least one processor, at least one apparatus to:
   obtain at least one source of media content to be used as a reference media content;
   receive a selection associated with at least one stylistic parameter from a user;
   analyze the at least one reference media content according to at least one stylistic parameter characteristic to said at least one reference media content; and
   determine, on the basis of the at least one stylistic parameter characteristic to said at least one reference media content and analysis of the at least one reference media content according to the at least one stylistic parameter, at least one editing rule or parameter for controlling creation of an automatic media remix by analyzing sensory data to determine one or more points in time indicative of an event of interest in order to make switches between different aesthetic sources of media content to be used in the automatic media remix.

* * * * *